(12) United States Patent
Nishimura et al.

(10) Patent No.: US 11,273,874 B2
(45) Date of Patent: Mar. 15, 2022

(54) VEHICLE REAR BODY STRUCTURE

(71) Applicant: Mazda Motor Corporation, Hiroshima (JP)

(72) Inventors: Yoshikazu Nishimura, Hiroshima (JP); Hiroshi Nishioka, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 198 days.

(21) Appl. No.: 16/814,067

(22) Filed: Mar. 10, 2020

(65) Prior Publication Data

US 2020/0331538 A1    Oct. 22, 2020

(30) Foreign Application Priority Data

Apr. 17, 2019    (JP) .............................. JP2019-078317

(51) Int. Cl.
*B62D 25/18*    (2006.01)
*B62D 25/20*    (2006.01)

(52) U.S. Cl.
CPC ......... *B62D 25/18* (2013.01); *B62D 25/2027* (2013.01)

(58) Field of Classification Search
CPC ............................ B62D 25/18; B62D 25/2027
See application file for complete search history.

(56) References Cited

FOREIGN PATENT DOCUMENTS

| JP | 2012006507 A | | 1/2012 | |
|---|---|---|---|---|
| JP | 2016022860 A | * | 2/2016 | ........... B62D 25/087 |
| WO | WO-2016199499 A1 | * | 12/2016 | ............. B62D 25/08 |

* cited by examiner

*Primary Examiner* — D Glenn Dayoan
*Assistant Examiner* — Melissa Ann Bonifazi
(74) *Attorney, Agent, or Firm* — Alleman Hall Creasman & Tuttle LLP

(57) ABSTRACT

A vehicle rear body structure improves rigidity of a portion around a wheel house while suppressing an increase in body weight (number of components) as much as possible. While a wheel house inner is provided with a second inner side reinforcement extending in a vertical direction, in a wheel house outer, a bulged section, which is formed to be bulged to a cabin outer side, includes a wheel arch-shaped section formed in an arch shape to cover a rear wheel from above when seen in a vehicle side view. The wheel house outer is formed with an upward extending ridgeline section that extends upward above the wheel arch-shaped section along a bulged shape of the bulged section to the cabin outer side and at least a portion of which overlaps the second inner side reinforcement when seen in the vehicle side view.

20 Claims, 7 Drawing Sheets

VEHICLE REAR BODY STRUCTURE

TECHNICAL FIELD

The present invention relates to a vehicle rear body structure that is provided with a wheel house having a wheel house outer and a wheel house inner located on a cabin side from the wheel house outer.

BACKGROUND ART

As exemplified in Patent document 1, in regard to a vehicle rear body structure, a damper attachment section attached to an upper end portion of a suspension damper for supporting the upper end portion of the suspension damper receives vibrations and a load from a suspension, and thus rigidity of a portion around a wheel house provided adjacent to the damper attachment section is increased.

In Patent document 1, a configuration to reinforce the wheel house from both sides in a vehicle width direction by providing a reinforcement to each of a wheel house outer and a wheel house inner is disclosed. However, there is a concern that, while provision of the reinforcement on each of the sides of the wheel house in the vehicle width direction is advantageous in terms of improved rigidity, provision of the reinforcement also leads to an increase in body weight (number of components).

PRIOR ART DOCUMENTS

Patent Documents

Patent document 1: JP 2012-6507A

SUMMARY OF THE INVENTION

Problem to be Solved by the Invention

The present invention has been made in view of such a problem and therefore has a purpose of providing a vehicle rear body structure capable of improving rigidity of a portion around a wheel house while suppressing an increase in body weight (number of components) as much as possible.

Means for Solving the Problem

The present invention relates to a vehicle rear body structure comprising a wheel house that includes: a wheel house outer in a bulged shape that bulges toward a cabin outer side; and a wheel house inner located on a cabin side from the wheel house outer. The wheel house inner is provided with an inner-side reinforcement that extends in a vertical direction, and in the wheel house outer, a bulged section that bulges toward the cabin outer side includes a wheel arch-shaped section that is formed in an arch shape to cover a rear wheel from above when seen in a vehicle side view. The wheel house outer is formed with a ridgeline section that extends upward above the wheel arch-shaped section along a bulged shape of the bulged section to the cabin outer side and at least a portion of which overlaps the inner-side reinforcement when seen in the vehicle side view.

According to the above configuration, the portion of the wheel house outer, which overlaps the inner-side reinforcement when seen in the vehicle side view, is reinforced by the ridgeline section formed by the bulged shape of the bulged section. Thus, it is possible to improve rigidity without adding a component.

As an aspect of the present invention, in a portion above the wheel arch-shaped section in the bulged section, an upward extending section (e.g., a shelf section) that bulges toward the cabin outer side is provided to extend upward from the wheel arch-shaped section, and the ridgeline section is formed along a bulged shape of the upward extending section to the cabin outer side.

According to the above configuration, it is possible to effectively reinforce a portion of a body rear portion located above the wheel arch-shaped section by the ridgeline section formed along the bulged shape of the upward extending section.

As an aspect of the present invention, a damper attachment section to which an upper end portion of a suspension damper is attached for support is provided in a rear side frame provided on the cabin side and in a lower portion of the wheel house. The inner-side reinforcement extends upward from the damper attachment section provided in the rear side frame, and the ridgeline section of the wheel house outer extends upward across the wheel arch-shaped section from a height of the rear side frame to the upward extending section.

According to the above configuration, the ridgeline section can suppress deformation of the inner-side reinforcement, which is caused by an external force applied to the body side from the suspension damper via the damper attachment section.

As an aspect of the present invention, a door opening rear edge reinforcing member is joined to the upward extending section, the door opening rear edge reinforcing member extending along a rear edge of a door opening provided in a body side portion and used for seating on and leaving from a rear seat. The ridgeline section extends to the door opening rear edge reinforcing member and the inner-side reinforcement, which is provided on a vehicle rear side from the door opening rear edge reinforcing member.

According to the above configuration, in the rear body structure, it is possible to increase rigidity of a portion from the rear edge of the door opening to the inner-side reinforcement.

As an aspect of the present invention, a rear header that extends in a vehicle width direction is provided on a vehicle front side and a vehicle upper side of the inner-side reinforcement, a closed cross-sectional structure that extends rearward from the rear header and is lowered to the rear is provided above the wheel house, and an upper end of the inner-side reinforcement is joined to a portion, which is separated rearward from a joined section with the rear header, in the closed cross-sectional structure.

According to the above configuration, it is possible to effectively support the portion separated from the joined section with the rear header in the closed cross-sectional structure by the upper end of the inner-side reinforcement. Thus, it is possible to suppress deformation of the closed cross-sectional structure with the rear header being a point of origin during travel of the vehicle when seen in the vehicle side view and when seen in a vehicle rear view.

As an aspect of the present invention, the ridgeline section extends in the vertical direction at a position that is separated rearward in the vehicle from the inner-side reinforcement.

According to the above configuration, the ridgeline section extends upward at the position separated from the inner-side reinforcement in a vehicle front-rear direction. Thus, from the portion that is separated rearward from the joined section of the inner-side reinforcement with the rear header, the ridgeline section can further effectively suppress the deformation of the closed cross-sectional structure with the rear header being the point of origin when seen in the vehicle side view and when seen in the vehicle rear view.

As an aspect of the present invention, the upward extending section is provided with a plurality of the ridgeline sections, each of which extends in the vertical direction.

According to the above configuration, it is possible to simultaneously exert a displacement suppressing effect for the inner-side reinforcement, the deformation of which is caused by the external force applied from the damper, and a deformation suppressing effect for a rear pillar with the rear header being a point of origin without increasing the body weight. ADVANTAGE OF THE INVENTION According to the present invention, it is possible to improve the rigidity of the portion around the wheel house while suppressing the increase in the body weight (the number of components) as much as possible.

MODES FOR CARRYING OUT THE INVENTION

Figure 1:
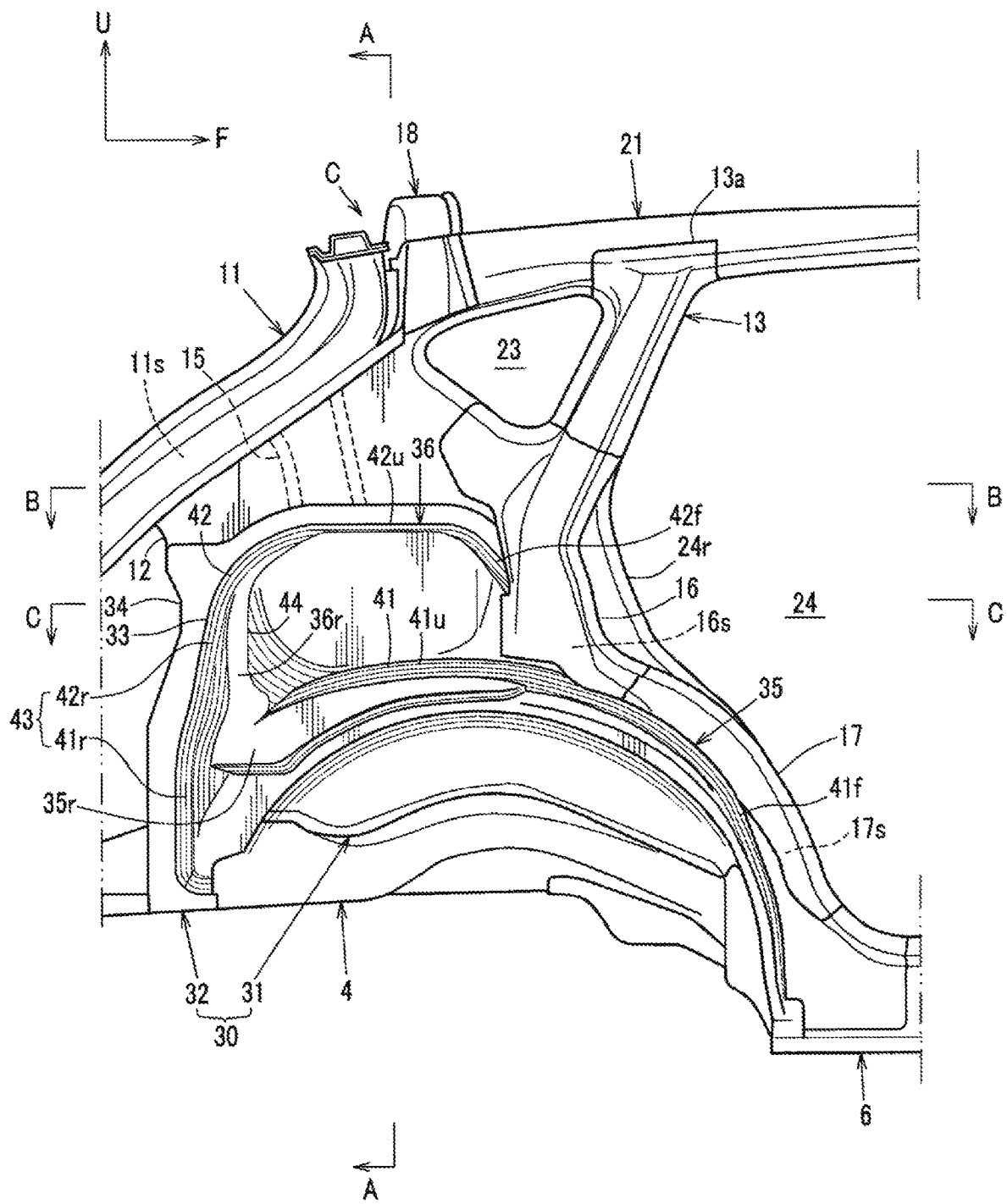
FIG. 1 is a right-side view of a main section of a rear body structure according to an embodiment.

A detailed description will hereinafter be given for an embodiment of the present invention with reference to the drawings. In the drawings, an arrow F indicates a vehicle front direction, an arrow R indicates a vehicle right direction, an arrow L indicates a vehicle left direction, an arrow U indicates a vehicle up direction, an arrow out indicates a cabin outer side (an outer side in a vehicle width direction), and an arrow in indicates a cabin side (an inner side in the vehicle width direction).

A vehicle rear body structure in this embodiment is substantially and bilaterally symmetrical. Thus, a description will be centered on a configuration on a right side of the vehicle. In the drawings, an outer panel as a body outer plate is not illustrated unless otherwise particularly noted.

Figure 2:
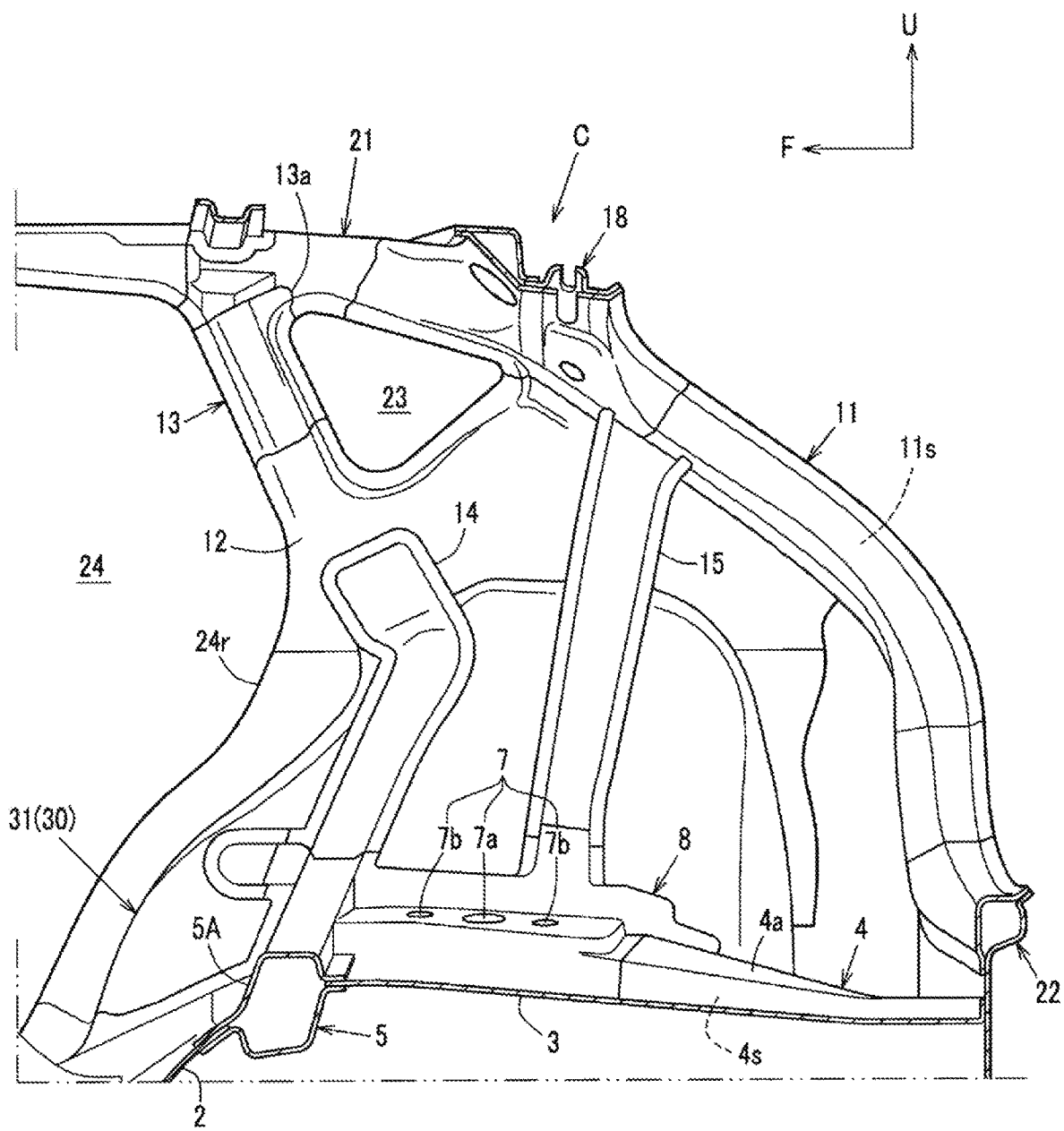
FIG. 2 is a vertical cross-sectional view of a main section of a right surface of the rear body structure according to the embodiment when seen from a cabin side.

As illustrated in FIG. 1 and FIG. 2, the vehicle in this embodiment is an automobile of a door hatchback type, that includes a rear gate opening 1 (see FIG. 5), which is opened rearward from a trunk as a rear section provided in a body rear portion, in the body rear portion. The rear gate opening 1 includes a rear gate of a flip-open type (not illustrated).

A description will be given for a lower portion of the body rear portion as a premised structure of the vehicle rear body structure in this embodiment.

As illustrated in FIG. 2, in the lower portion of the body rear portion, a rear seat pan 2, on which rear seats (not illustrated) are placed, and a rear floor panel 3 for forming the trunk are provided. On both sides of these rear seat pan 2 and the rear floor panel 3, rear side frames 4, each of which extends in a vehicle front-rear direction, are provided. In addition, on a boundary section between the rear seat pan 2 and rear floor panel 3, a cross member 5 that extends in the vehicle width direction is provided.

The rear side frame 4 includes: a rear side frame upper 4a (see FIG. 2 and FIG. 4) having a hat-shaped cross section that is opened downward and is projected upward; and a rear side frame lower 4b (see FIG. 4) having a hat-shaped cross section that is opened upward and is projected downward. These constitute a closed cross section 4s that extends in the vehicle front-rear direction therein. Inner edges in the vehicle width direction of the rear side frames 4 on both of the sides hold and fix outer edges in the vehicle width direction of the rear seat pan 2 and the rear floor panel 3 therebetween.

Figure 6:
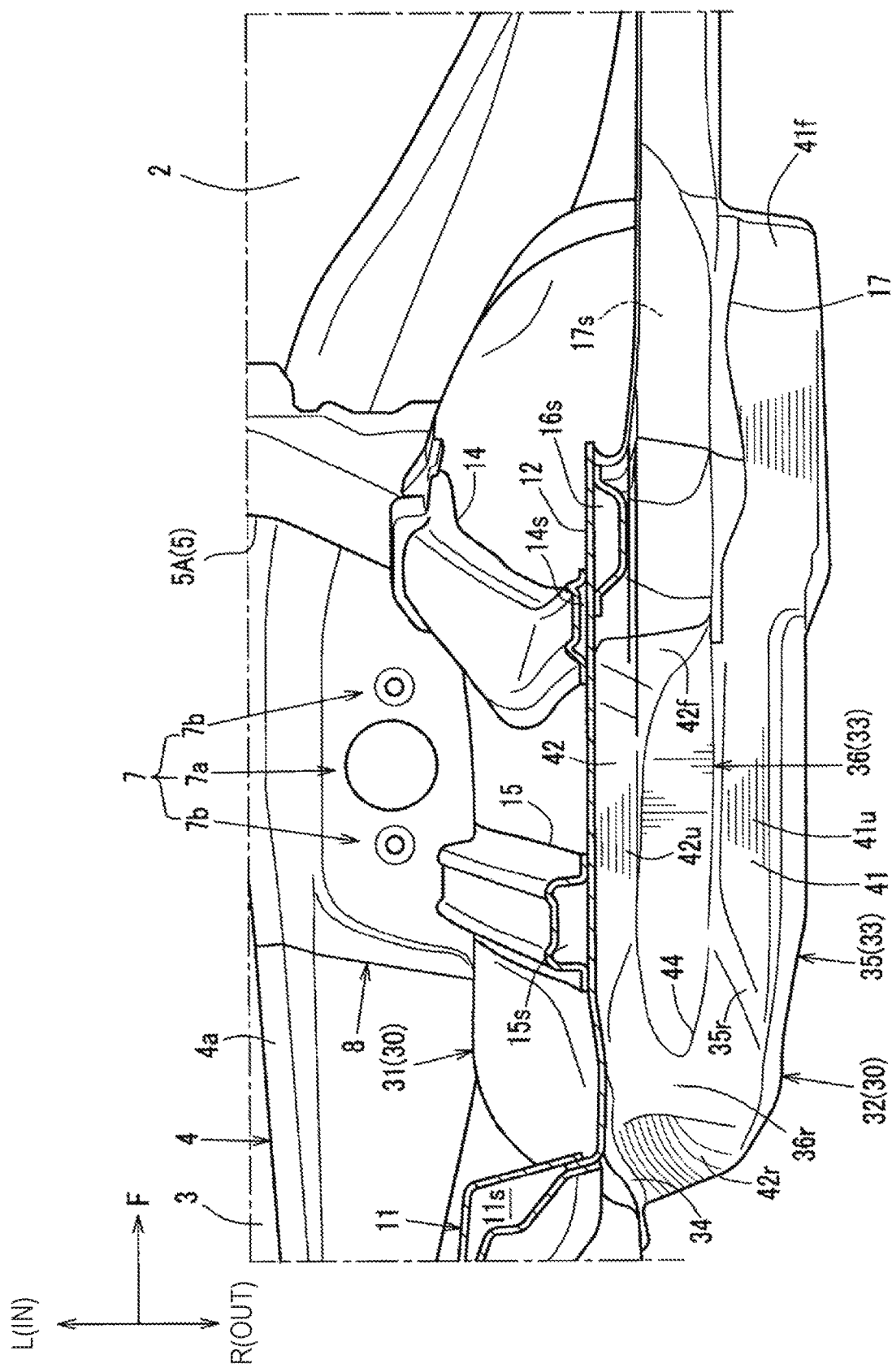
FIG. 6 is a cross-sectional view of the main section taken along line B-B in FIG. 1.

As illustrated in FIG. 2 and FIG. 6, on a cabin side of a wheel house 30, the rear side frame 4 extends in the vehicle front-rear direction from a rear end of the rear floor panel 3 and passes the wheel house 30. A front-end portion of the rear side frame 4 is connected to a rear portion of a side sill 6 (not illustrated).

A damper attachment section 7 to which an upper end portion of an unillustrated rear suspension damper (hereinafter abbreviated as a "damper") is attached for support is provided at a position that is an intermediate position in the vehicle front-rear direction of the rear side frame 4 (a position corresponding to an unillustrated rear suspension) and that corresponds to the cabin side of the wheel house 30, which will be described later.

A reinforcing member 8 that reinforces a portion around the damper attachment section 7 is provided in an upper portion of the rear side frame 4. The reinforcing member 8 is shaped by aluminum die-casting or the like, and is provided to cover the portion around the damper attachment section 7 from above while extending between the upper portion of the rear side frame 4 and the wheel house 30.

The damper attachment section 7 is configured to include: a damper insertion hole 7a through which the damper is inserted; and damper fastening sections 7b provided on both front and rear sides of the damper insertion hole 7a to fasten and fix the damper to the rear side frame 4 and the reinforcing member 8. Each of these damper insertion hole 7a and the damper fastening sections 7b on the front and rear sides has portions that respectively correspond to the rear side frame 4 and the reinforcing member 8, and thus perforated in a vertical direction.

The reinforcing member 8 is formed such that an upper surface thereof is one-step higher than an upper surface of the rear side frame 4. On the upper surface of the rear side frame 4, a circumferential edge of the damper fastening section 7b on each of the front and rear sides is recessed downward.

Next, a description will be given for a side portion of the vehicle rear body in this embodiment.

Figure 3:
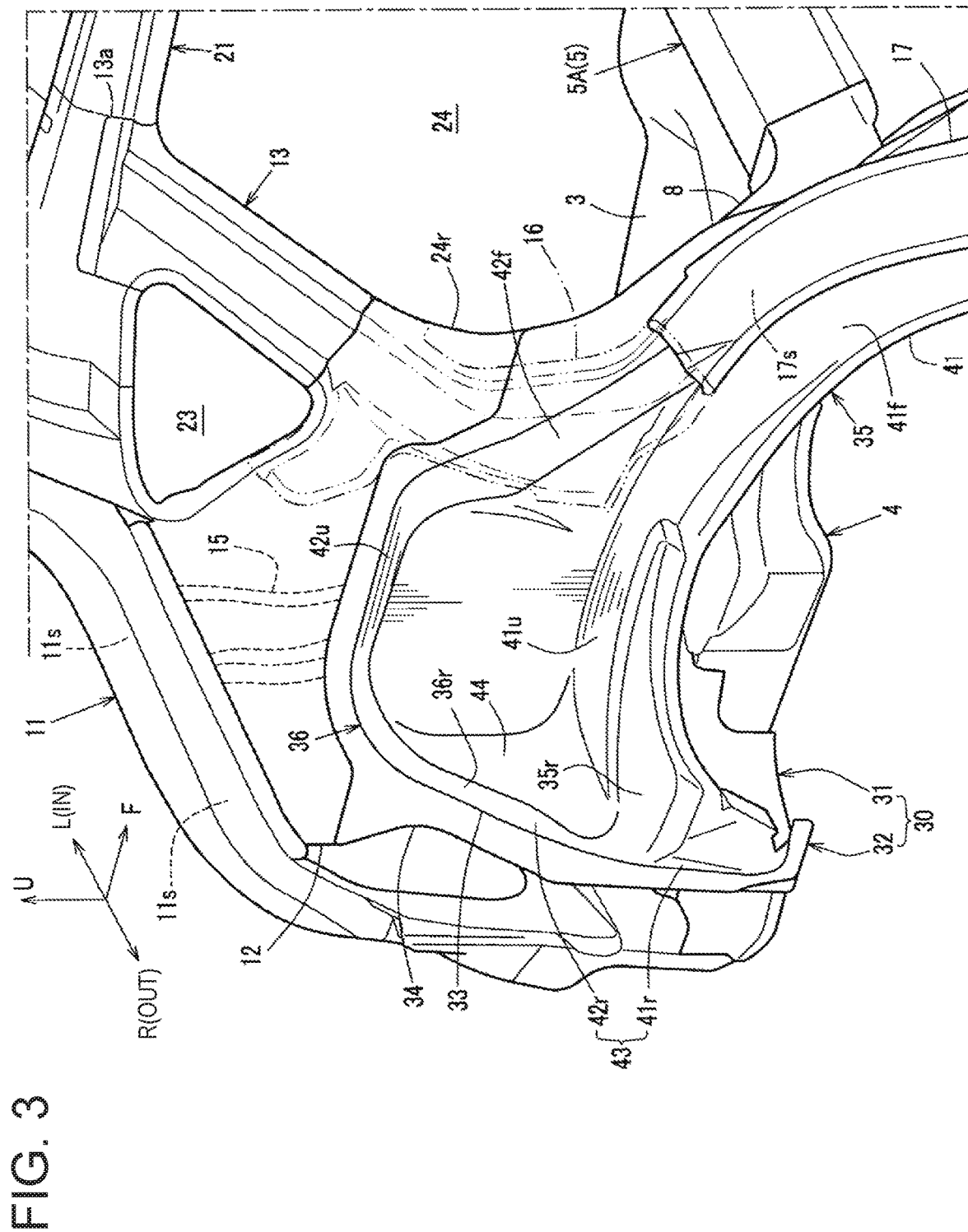
FIG. 3 is a perspective view of the main section of the rear body structure according to the embodiment that is seen obliquely downward from a front right side.

As illustrated in FIG. 1 to FIG. 3, in the side portion of the rear body in this embodiment is provided with a rear pillar 11, a side inner panel 12, an intermediate pillar 13, first and second inner-side reinforcements 14, 15 (see FIG. 2), the wheel house 30, and first and second door opening rear edge reinforcing members 16, 17 (a first door opening rear edge reinforcing member 16 and a second door opening rear edge reinforcing member 17).

The rear pillar 11 extends downward and rearward from a side on each of right and left sides of the rear gate opening 1, and a closed cross section 11s (see FIG. 6) that extends along an extending direction of the rear pillar 11 is defined therein.

Just as described, the rear pillar 11, which extends in the vehicle front-rear direction (the vertical direction) in the body rear portion, has an upper end that is joined to an outer end in the vehicle width direction of a rear header 18 extending in the vehicle width direction along an upper side of the rear gate opening 1 and to a rear end of a roof side rail 21 extending along the vehicle front-rear direction on each side of a roof section. Such a joined portion will hereinafter be referred to as a "joined section C". A lower end portion of the rear pillar 11 is joined to an outer end in the vehicle width direction of a rear end member 22 that extends in the vehicle width direction along a lower edge of the rear gate opening 1 (see FIG. 2 and FIG. 4).

The side inner panel 12 is a panel that forms a trunk side wall. A lower portion of the side inner panel 12 is disposed up to a circumferential edge (mainly an upper portion and a front portion) of the wheel house 30 on the side of the body rear portion except for a lower portion of the circumferential edge in a manner to be held between a wheel house inner 31 and a wheel house outer 32, which will be described later.

In particular, a portion of the side inner panel 12 above the wheel house 30 is disposed between the rear pillar 11 and the wheel house 30.

As illustrated in FIG. 1 and FIG. 3, the intermediate pillar 13 corresponds to a front side of an opening 23 for a quarter window. An upper end 13a of the intermediate pillar 13 is joined to a rear portion of the roof side rail 21 by spot welding or the like.

The opening 23 for the quarter window is constructed of the rear portions of the intermediate pillar 13 and the roof side rail 21 and an upper portion of a front edge of the side inner panel 12.

As illustrated in FIG. 2 and FIG. 6, on the cabin side in the side portion of the vehicle rear portion, the first and second inner-side reinforcements 14, 15 (the first inner side reinforcement 14 and the second inner side reinforcement 15) are provided on each side in the vehicle front-rear direction. Each of the first and second inner-side reinforcements 14, 15 extends upward from a height of the rear side frame 4 to at least a portion of the side inner panel 12 above the wheel house inner 31 in a manner to run across the wheel house inner 31 in the vertical direction (see FIG. 2).

Figure 7:
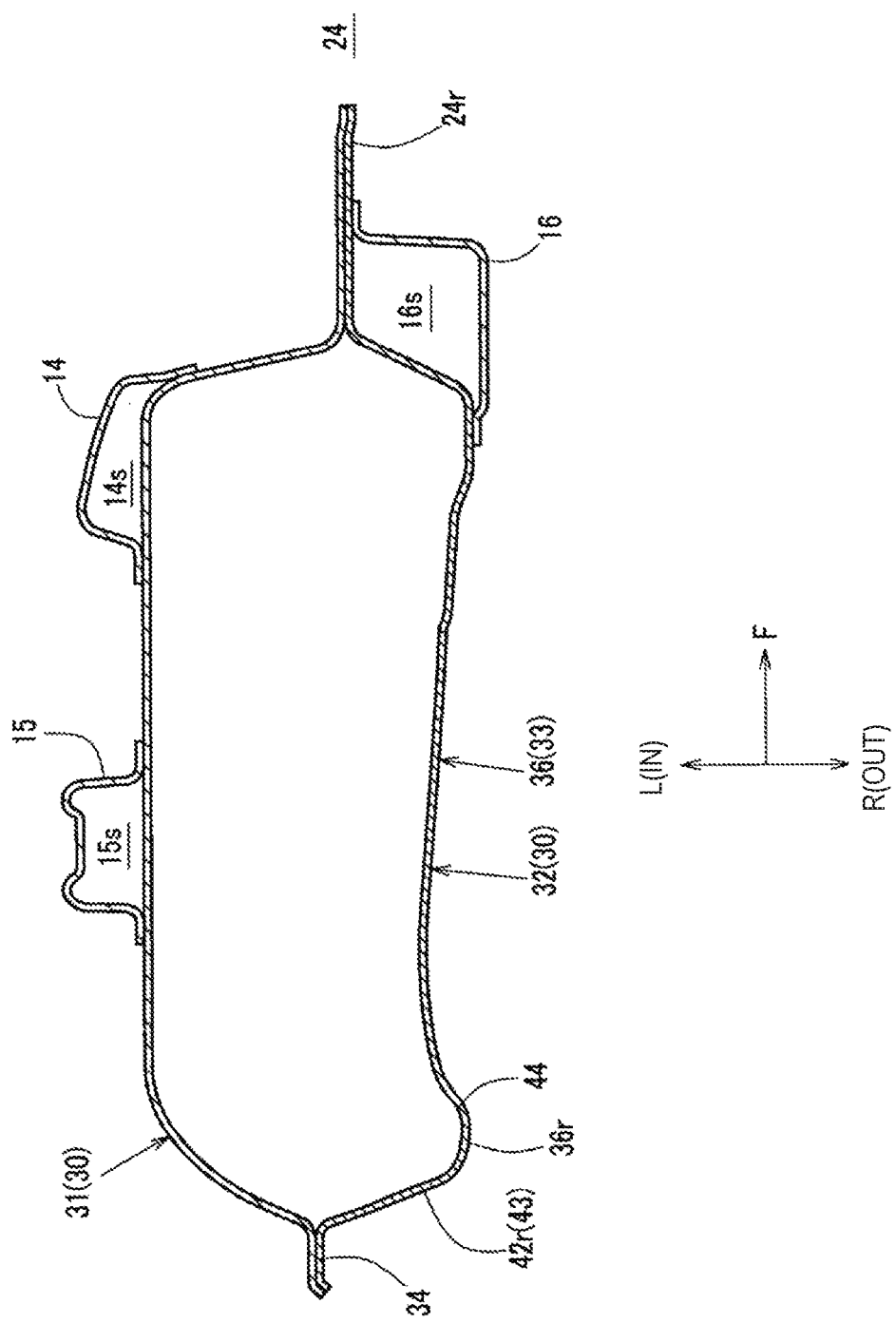
FIG. 7 is a cross-sectional view of the main section taken along line C-C in FIG. 1.

Each of these first and second inner-side reinforcements 14, 15 has a hat-shaped horizontal cross section (a cross section orthogonal to the vertical direction) that is opened to a cabin outer side, and cooperates with the side portion of the vehicle rear portion, that is, the wheel house inner 31 and the side inner panel 12 to define respective one of closed cross sections 14s, 15s that extend in the vertical direction between the wheel house inner 31 and the side inner panel 12 (see FIG. 6 and FIG. 7).

As illustrated in FIG. 2, the first inner side reinforcement 14 on the front side extends upward to a substantially lower end portion of the intermediate pillar 13 from an outer end in the vehicle width direction of an upper cross member 5A, which is projected upward (has a hat-shaped cross section opened downward) with respect to the rear floor panel 3, in the cross member 5, so as to run across the wheel house inner 31.

The second inner side reinforcement 15 on the rear side extends upward across the wheel house inner 31 and the side inner panel 12 from the rear side frame 4, and an upper end of the second inner side reinforcement 15 is joined to an upper portion of the rear pillar 11 (see FIG. 2).

More specifically, the upper end of the second inner side reinforcement 15 is joined to a portion of the rear pillar 11, which extends while tilting downward to the rear, and the portion is slightly separated rearward from the joined section C (the front end) with the rear header 18.

A lower portion of each of the first and second inner-side reinforcements 14, 15 is integrally formed with the reinforcing member 8. The first and second inner-side reinforcements 14, 15 extend upward from portions of the rear side frame 4 on front and rear sides of the damper attachment section 7 (the front and rear sides of the damper insertion hole 7a) via the reinforcing member 8. In particular, a position of the lower portion of the second inner side reinforcement 15 matches a position of the damper fastening section 7b on the rear side in the vehicle front-rear direction of the rear side frame 4, and the second inner side reinforcement 15 extends upward in a substantially linear manner from a portion corresponding to the damper fastening section 7b on the rear side (see FIG. 2).

Figure 4:
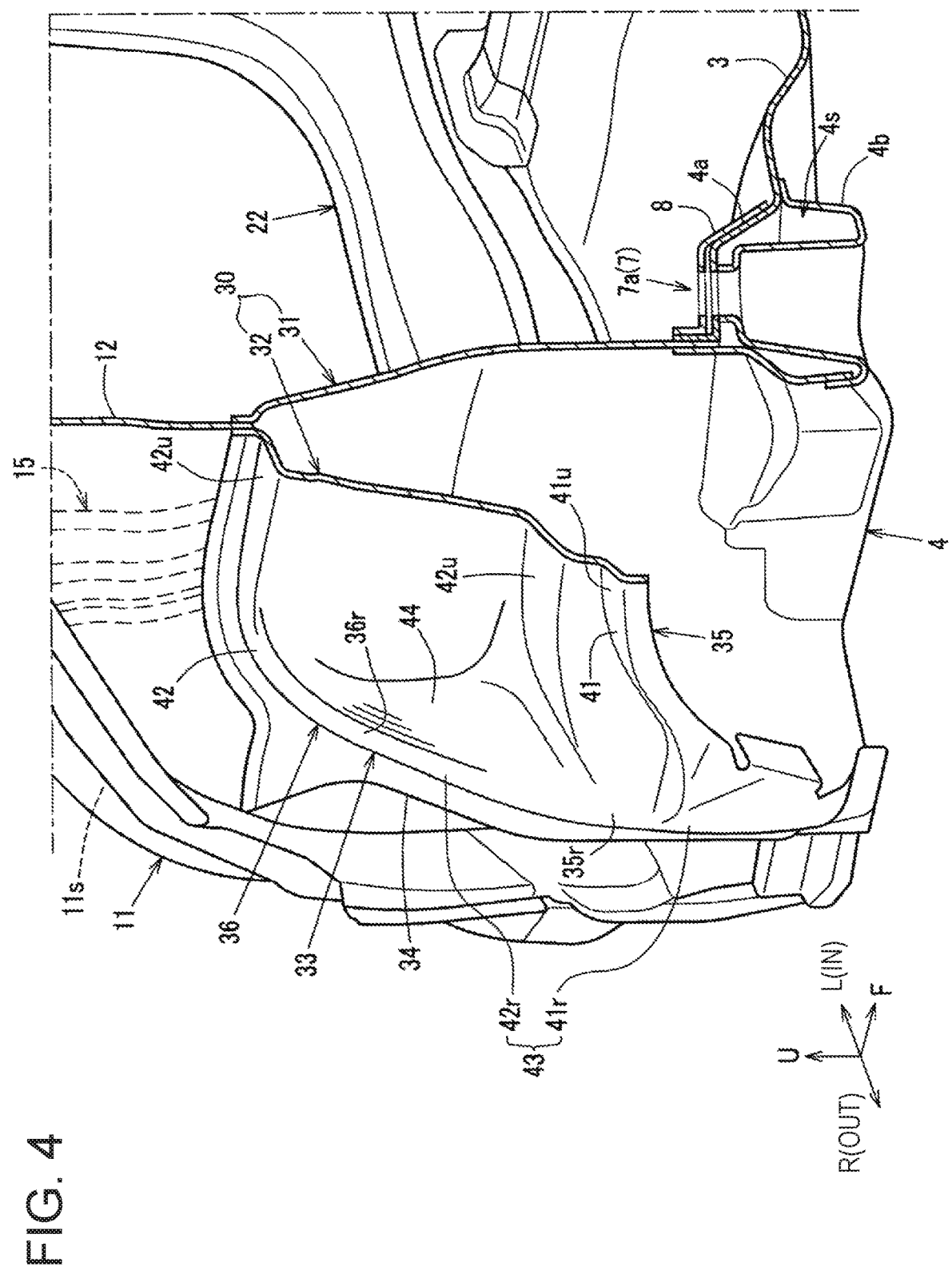
FIG. 4 is a perspective view in which a cross section taken along line A-A in FIG. 1 is seen obliquely rightward from above.

As illustrated in FIG. 4, the wheel house 30 is configured that an upper portion of a rear wheel (not illustrated) can be accommodated from a rear side to a front side thereof in the wheel house inner 31, which bulges toward the cabin side, and the wheel house outer 32, which bulges toward the cabin outer side.

Each of the wheel house inner 31 and the wheel house outer 32 is configured to include: a bulged section 33 that bulges toward a respective one of the cabin side and the cabin outer side; and a flange 34 that is formed at an outer edge thereof except for a lower edge when seen in the vehicle side view. The flanges 34 are joined to each other so as to hold a lower edge of the side inner panel 12 therebetween.

A detailed description will hereinafter be given for the wheel house outer 32. The bulged section 33 of the wheel house outer 32 is integrally formed with a wheel arch-shaped section 35 and an upward extending section 36 (a shelf section). The wheel arch-shaped section 35 is provided in a lower portion including a lower edge of the bulged section 33, and, in an upper portion of the bulged section 33, the upward extending section 36 extends upward from the wheel arch-shaped section 35.

The wheel house inner 31 is formed to correspond to the wheel house outer 32 and thus extends upward to the substantially same height as the bulged section 33 (see FIG. 4).

The wheel arch-shaped section 35 is formed in a shape that follows a lower edge of the wheel house outer 32, that is, an arch shape (an arcuate shape) in which an intermediate portion in the vehicle front-rear direction is projected upward when seen in the vehicle side view.

Figure 5:
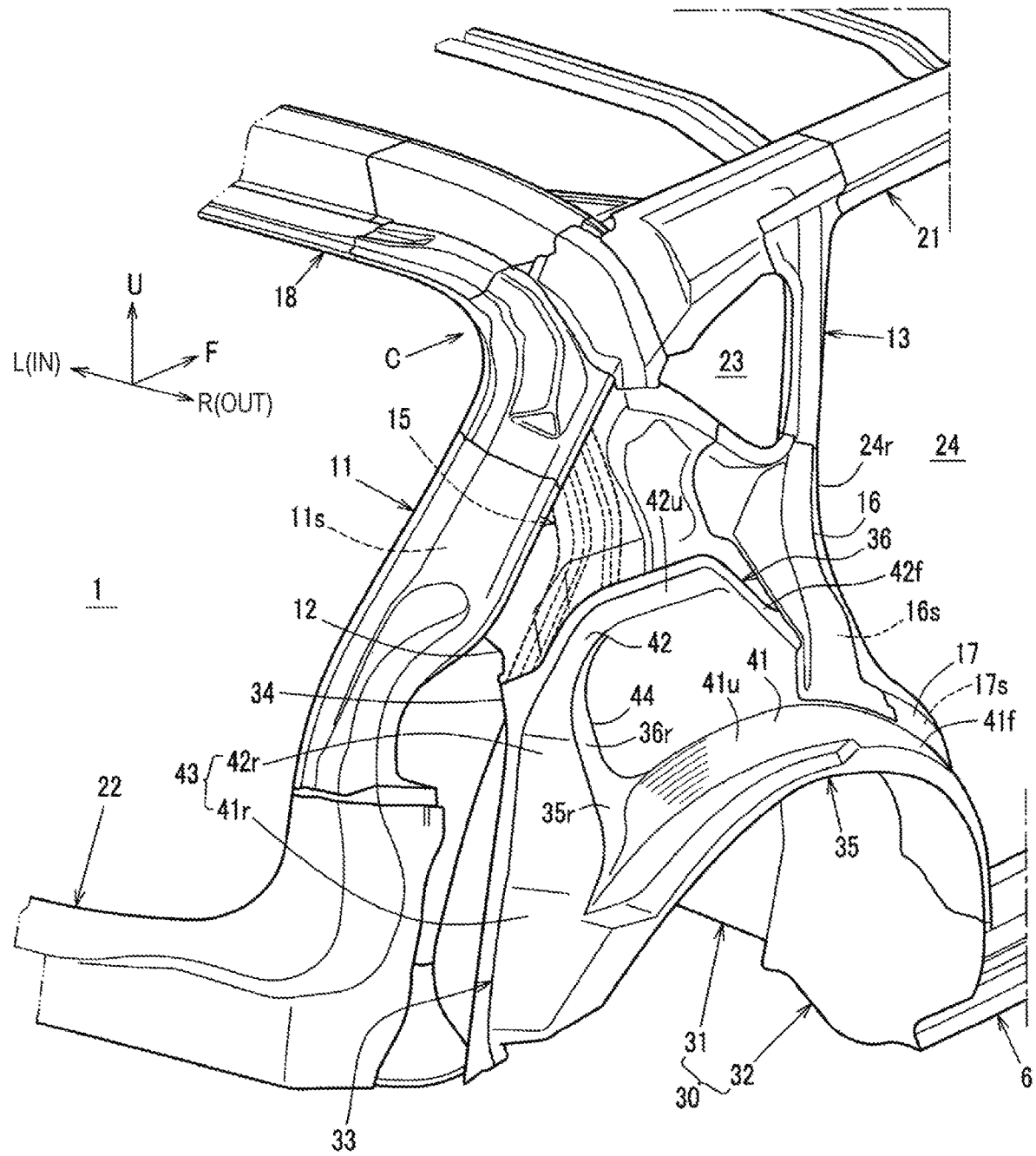
FIG. 5 is a perspective view in which the main section of the rear body structure according to this embodiment is seen obliquely downward from a rear right side.

As illustrated in FIG. 1 and FIG. 5, a front portion of the wheel arch-shaped section 35 is formed to be gradually lowered to the front, and a front lower end thereof is connected to a rear portion of the side sill 6. The front portion of the wheel arch-shaped section 35 is formed such that a front edge thereof is located in front of the front edge of the side inner panel 12, so as to form a lower portion of a rear edge 24r of a door opening 24, which is provided on the body side portion and is used for seating on and leaving from the rear seat (see FIG. 1).

As illustrated in FIG. 1, the upward extending section 36 extends upward from the wheel arch-shaped section 35, and a lower end portion thereof extends upward from a rear end of the wheel arch-shaped section 35 such that the upward extending section 36 has a width in the vehicle front-rear direction between the rear end and a position slightly in front of an apex (an upper end) of the wheel arch-shaped section 35. That is, the upward extending section 36 is provided across the second inner side reinforcement 15 in the vehicle front-rear direction.

The bulged section 33 is integrally formed such that internal spaces of the upward extending section 36 and the wheel arch-shaped section 35 provided on upper and lower sides thereof communicate with each other in the vertical direction (see FIG. 4).

Meanwhile, as illustrated in FIG. 3 to FIG. 6, the upward extending section 36 is formed such that a bulged length (a bulged amount) to the cabin outer side of the substantially entire upward extending section 36 except for a rear portion 36r is less than that of the wheel arch-shaped section 35. In this example, the substantially entire upward extending section 36 except for the rear portion 36r bulges along a bulged length that is approximately one half of the bulged length of the wheel arch-shaped section 35. Meanwhile, a rear portion 35r of the wheel arch-shaped section 35 bulges such that, as the rear portion 35r is gradually lowered, a bulged length thereof becomes substantially equal to the bulged length of the wheel arch-shaped section 35 (see FIGS. 3 to 6).

Such a bulged section 33, that is, the wheel arch-shaped section 35 and the upward extending section 36 are each formed in a bulged shape to the cabin outer side. In this way, step-shaped ridgeline sections 41, 42, each of which extends in the vertical direction and the front-rear direction when seen in the vehicle side view, are formed.

That is, the ridgeline sections 41, 42 correspond to portions that are bulged in a stepwise manner to the cabin outer side in a state where a portion therearound is seen in a horizontal cross section or a perpendicular cross section (a cross section orthogonal to the front-rear direction).

More specifically, when seen in the vehicle side view, in the wheel arch-shaped portion 35, a ridgeline section 41 in an arch shape (hereinafter also referred to as an "arch-shaped ridgeline section 41") is formed along a circumferential edge (an upper edge portion from the rear end to a front end) except for a lower end.

The arch-shaped ridgeline section 41 includes: a front side portion 41f that extends to be located downward to the front; an upper side portion 41u that extends substantially horizontally across the apex of the wheel arch-shaped section 35 in the vehicle front-rear direction; and a rear side portion 41r that extends in the vertical direction more steeply than the front side portion while being inclined downward to the rear. Of these, while the front side portion 41f and the upper side portion 41u extend continuously when seen in the vehicle side view, the upper side portion 41u and the rear side portion 41r are separated from each other via the rear portion 35r of the wheel arch-shaped section 35.

Here, as described above, the rear portion 35r of the wheel arch-shaped section 35 and the rear portion 36r of the upward extending section 36 positioned right above the rear portion 35r are formed to have the substantially same bulged amount to the cabin outer side. In addition, as described above, a boundary between the rear portions 35r, 36r of the wheel arch-shaped section 35 and the upward extending section 36 in the vertical direction is located between the upper side portion 41u and the rear side portion 41r of the arch-shaped ridgeline section 41. Accordingly, the upper side portion 41u and the rear side portion 41r of the arch-shaped ridgeline section 41 are formed discontinuously in the vehicle front-rear direction.

As illustrated in FIG. 1, FIG. 3, and FIG. 5, when seen in the vehicle side view, in the upward extending section 36, a ridgeline section 42 (hereinafter also referred to as an "upward extending ridgeline section 42") is provided along a circumferential edge except for a lower end.

The upward extending ridgeline section 42 includes: a front side portion 42f that extends to be located downward to the front; an upper side portion 42u that extends substantially horizontally in the vehicle front-rear direction; and a rear side portion 42r that extends in the vertical direction more steeply than the front side portion 42f while being inclined downward to the rear. These front side portion 42f, the upper side portion 42u, and the rear side portion 42r extend continuously along the circumferential edge except for the lower end of the upward extending section 36 when seen in the vehicle side view.

The front side portion 42f of the upward extending ridgeline section 42 extends in the vertical direction more gently than the rear side portion 42r, and this front side portion 42f is set as a first vertical direction ridgeline section 42f.

This first vertical direction ridgeline section 42f is formed by the front side portion 42f of the upward extending ridgeline section 42, extends downward to the front so as to reach the wheel arch-shaped section 35, and extends in the vertical direction at a separated position on a front side from the second inner side reinforcement 15.

The rear side portion 42r of the upward extending ridgeline section 42 and the rear side portion 41r of the wheel arch-shaped section 35 extend continuously along the vertical direction when seen in the vehicle side view, and are collectively set as a second vertical direction ridgeline section 43.

A rear edge of the bulged section 33 extends continuously over substantially an entire length of the wheel house outer 32 in the vertical direction, and the second vertical direction ridgeline section 43 is formed in a vertical wall shape that is inclined steeply, so as to be located forward to the above by the rear edge of the bulged section 33.

At a separated position on the vehicle rear side from the second inner side reinforcement 15, the second vertical direction ridgeline section 43 extends substantially linearly to the above (the rear pillar 11) from the height of the rear side frame 4.

Here, as described above, the rear portion 36r of the upward extending section 36 is formed to be gradually bulged to the cabin outer side as the rear portion 36r is lowered so that the bulged amount of the lower portion thereof is substantially the same as that of the rear portion 35r of the wheel arch-shaped section 35 to the cabin outer side.

In addition, as illustrated in FIG. 3, FIG. 5, and FIG. 6, the rear portion 36r of the upward extending section 36 is formed to be bulged to the cabin outer side when compared to the front portion. Thus, a front edge of the rear portion 36r is formed in a vertical wall shape that extends in the vertical direction. Accordingly, the rear portion 36r of the upward extending section 36 is also formed with a ridgeline section 44 by the front edge in the vertical wall shape of the rear portion 36r. For this reason, the ridgeline section 44 at the front edge of the rear portion 36r of the upward extending section 36 is set as a third vertical direction ridgeline section 44.

Similar to the second vertical direction ridgeline section 43, at a separated position on the vehicle rear side from the second inner side reinforcement 15, this third vertical direction ridgeline section 44 extends in the vertical direction.

In addition, both of the upper side portion 42u of the upward extending ridgeline section 42 and the upper side portion 41u of the arch-shaped ridgeline section 41 extend across the second inner side reinforcement 15 in the vehicle front-rear direction, and overlap the second inner side reinforcement 15 when seen in the vehicle side view.

As illustrated in FIG. 1, FIG. 3, FIG. 5, and FIG. 6, the first and second door opening rear edge reinforcing members 16, 17, each of which extends in the vertical direction along the rear edge 24r, are provided at the rear edge 24r of the door opening 24, which is used for seating on and leaving from the rear seat.

The first door opening rear edge reinforcing member 16 is a reinforcing member that reinforces an intermediate portion in the vertical direction of the rear edge 24r of the door opening 24 (between the intermediate pillar 13 and the wheel arch-shaped section 35). The first door opening rear edge reinforcing member 16 is formed to have a hat-shaped cross section such that a cross section orthogonal to the extending direction thereof is opened to the cabin side, and cooperates with the side inner panel 12 to define a closed cross section 16s with the side inner panel 12 (see FIG. 6 and FIG. 7). An upper end of the first door opening rear edge reinforcing member 16 is joined to a lower end of the intermediate pillar 13, and a lower end of the first door opening rear edge reinforcing member 16 is joined to a front lower portion of the upward extending section 36, that is, a lower portion of the first vertical direction ridgeline section 42f (see the first door opening rear edge reinforcing member 16 indicated by imaginary lines in FIG. 3).

The second door opening rear edge reinforcing member 17 is a reinforcing member that reinforces a lower portion of the rear edge 24r of the door opening 24 (the front side portion 41f of the wheel arch-shaped section 35), extends along the lower portion of the rear edge 24r of the door opening 24, that is, the front side portion 41f of the wheel arch-shaped section 35, and is formed to have a hat-shaped cross section such that a cross section orthogonal to the extending direction is opened to the front side portion 41f. Then, the second door opening rear edge reinforcing member 17 cooperates with the front side portion 41f of the wheel arch-shaped section 35 so as to define a closed cross section 17s with the wheel arch-shaped section 35 (see FIG. 1 and FIG. 2).

A rear upper portion of the second door opening rear edge reinforcing member 17 is joined to a lower portion (a root portion) of the first door opening rear edge reinforcing member 16, and a front lower portion of the second door opening rear edge reinforcing member 17 is joined to the rear portion of the side sill 6 (see FIG. 1).

The vehicle rear body structure according to above-described embodiment is the vehicle rear body structure that is provided with the wheel house 30 having: the wheel house outer 32 in the bulged shape to the cabin outer side; and the wheel house inner 31 located on the cabin side from the wheel house outer 32. While the wheel house inner 31 is provided with the second inner side reinforcement 15 (the inner-side reinforcement) that extends in the vertical direction, the bulged section 33 formed in the wheel house outer 32 in the manner to be bulged to the cabin outer side includes the wheel arch-shaped section 35 formed in the arch shape to cover the rear wheel from above when seen in the vehicle side view. The wheel house outer 32 is formed with the upward extending ridgeline section 42 (the ridgeline section 42) that extends upward to the position above the wheel arch-shaped section 35 along the bulged shape of the bulged section 33 bulged to the cabin outer side, and at least the portion of the upward extending ridgeline section 42 (the ridgeline section 42) overlaps the second inner side reinforcement 15 when seen in the vehicle side view (see FIG. 1 and FIG. 3 to FIG. 7).

According to the above configuration, the portion of the wheel house outer 32, which overlaps the second inner side reinforcement 15 when seen in the vehicle side view, is reinforced by the ridgeline sections 41, 42 formed by the bulged section 33. Thus, it is possible to improve rigidity without adding a reinforcing component.

More specifically, according to the above configuration, in the wheel house outer 32, the ridgeline section 42 that extends upward to the position above the wheel arch-shaped section 35 is formed by the bulged shape of the bulged section 33. Thus, it is possible to reinforce the wheel house outer 32 itself, that is, the cabin outer side in the body rear portion without adding a component such as a reinforcing member (that is, increasing body weight).

In addition, the ridgeline section 42 is formed to overlap the second inner side reinforcement 15 when seen in the vehicle side view. That is, in this example, of the upward extending ridgeline section 42, the upper side portion 42u extends in the vehicle front-rear direction across the second inner side reinforcement 15, which extends in the vertical direction. Thus, the upward extending ridgeline section 42 and the second inner side reinforcement 15 cooperate with each other to increase the rigidity around the wheel house 30 from both sides that are the cabin side (the inner side) and the cabin outer side (the outer side).

As an aspect of the present invention, according to the above configuration, at the position above the wheel arch-shaped section 35 in the bulged section 33, the upward extending section 36 is provided to be bulged to the cabin outer side so as to extend upward from the wheel arch-shaped section 35. The upward extending ridgeline section 42 is formed along the bulged shape of the upward extending section 36 to the cabin outer side (see FIG. 1 and FIG. 3 to FIG. 7).

According to the above configuration, the bulged section 33 allows the integral formation of the upward extending section 36 and the wheel arch-shaped section 35 on the upper and lower sides. Thus, it is possible to increase strength of the wheel house outer 32.

As an aspect of the present invention, the rear side frame 4, which is provided on the cabin side and in the lower portion of the wheel house 30, is provided with the damper attachment section 7 to which the upper end portion of the damper (not illustrated) is attached for support (see FIG. 2 and FIG. 6). The second inner side reinforcement 15 extends upward from the damper attachment section 7 (the rear side damper fastening section 7b in this example), which is provided in the rear side frame 4, in the vehicle front-rear direction (see FIG. 2). The ridgeline sections 41, 42 of the wheel house outer 32, that is, the second vertical direction ridgeline section 43 continuously extends upward across the wheel arch-shaped section 35 from the height of the rear side frame 4 to the upward extending section 36 (see FIG. 1 and FIG. 3 to FIG. 5).

According to the above configuration, similar to the second inner side reinforcement 15, the second vertical direction ridgeline section 43 extends upward from the height of the rear side frame 4. Thus, the second vertical direction ridgeline section 43 can suppress the displacement of the second inner side reinforcement 15, which is caused by an external force applied from the damper to the body side via the damper attachment section 7.

In detail, in order to disperse the external force, which is applied from the damper to the body side via the damper attachment section 7, for example, only the cabin side is reinforced by providing the second inner side reinforcement 15, which extends upward from the damper attachment section 7 in the cabin side, or the like. In such a case, a difference in rigidity occurs between the cabin side and the cabin outer side. Thus, it is necessary to relatively increase the strength on the cabin outer side.

However, in the case where the cabin outer side (the wheel house outer 32) is simply reinforced by providing the reinforcing member, or the like, the body weight (the number of components) is increased.

Meanwhile, in this embodiment, the ridgeline sections 41, 42 (particularly, the second vertical direction ridgeline section 43), each of which extends upward from the height of the rear side frame 4, are formed in the wheel house outer 32 by the bulged shape of the bulged section 33. In this way, it is possible to also reinforce the cabin outer side, and thus can cancel the difference in rigidity between the cabin side and the cabin outer side.

As a result, the number of the components (the body weight) of the vehicle is not increased, and the external force, which is transmitted from the damper to the body rear portion, can effectively be dispersed above the body by the second inner side reinforcement 15 and the ridgeline sections 41, 42 of the wheel house outer 32.

As an aspect of the present invention, the first door opening rear edge reinforcing member 16 (the door opening rear edge reinforcing member) is joined to the upward extending section 36, the first door opening rear edge reinforcing member 16 (the door opening rear edge reinforcing member) extending along the rear edge 24r of the door opening 24 provided in the body side portion and used for seating on and leaving from the rear seat (see FIG. 1, FIG. 3, and FIG. 5 to FIG. 7). The front side portion 42f and the upper side portion 42u of the upward extending ridgeline section 42 continuously extend to the first door opening rear edge reinforcing member 16 and the second inner side reinforcement 15, which is provided on the vehicle rear side of the first door opening rear edge reinforcing member 16 (see FIG. 1, FIG. 3, FIG. 5, and FIG. 6).

According to the above configuration, in the rear body structure, it is possible to increase the rigidity of the portion from the rear edge 24r of the door opening 24 to the second inner side reinforcement 15.

That is, the first door opening rear edge reinforcing member 16 and the second inner side reinforcement 15 are connected by the front side portion 42f and the upper side portion 42u of the upward extending ridgeline section 42 when seen in the vehicle side view. In this way, compared to a case where these components 15, 16 are independently provided, it is possible to effectively increase rigidity between these first door opening rear edge reinforcing member 16 and second inner side reinforcement 15.

As an aspect of the present invention, the rear header 18, which extends in the vehicle width direction, is provided on the vehicle front side and the vehicle upper side of the second inner side reinforcement 15. The rear pillar 11 (the closed cross-sectional structure), which extends rearward from the rear header 18 and is lowered to the rear, is provided above the wheel house 30. The upper end of the second inner side reinforcement 15 is joined to the portion, which is separated rearward from the joined section C with the rear header 18, in the rear pillar 11 (see particularly FIG. 2 of FIG. 1 to FIG. 5).

In detail, in the configuration in which the rear pillar 11, which constitutes the lateral side of the rear gate opening 1, is provided to be lowered rearward from the outer end in the vehicle width direction of the rear header 18, it is concerned that the rear pillar 11 vibrates (swings) and is deformed with the rear header 18 as a point of origin during travel of the vehicle when seen in the vehicle side view and when seen in the vehicle rear view.

More specifically, during the travel of the vehicle, the lower rear portion of the rear pillar 11 vibrates in the vertical direction (in the front-rear direction) with the rear header 18 being a fulcrum point when seen in the vehicle side view. When seen in the vehicle rear view, the lower rear portion thereof vibrates between the inner side and the outer side with the rear header 18 being the fulcrum point.

Meanwhile, in this embodiment, the portion of the rear pillar 11 separated from the joined section C with the rear header 18 is supported by the upper end of the second inner side reinforcement 15. In this way, compared to the case where the joined section C of the rear pillar 11 with the rear header 18 is supported, it is possible to effectively suppress the above-described deformation of the rear pillar 11 during the travel (with the principle of leverage).

As an aspect of the present invention, at the separated position on the vehicle rear side from the second inner side reinforcement 15, the second vertical direction ridgeline section 43 as the ridgeline section extends in the vertical direction (see FIG. 1 and FIG. 3 to FIG. 7).

According to the above configuration, the second vertical direction ridgeline section 43 extends upward at the separated position from the second inner side reinforcement 15 in the vehicle front-rear direction. Thus, from the portion that is further separated rearward in the vehicle from the joined section C of the second inner side reinforcement 15 with the rear header 18, the second vertical direction ridgeline section 43 can further effectively suppress the deformation of the rear pillar 11 with the rear header 18 being the point of origin during the travel of the vehicle when seen in the vehicle side view and when seen in the vehicle rear view.

In detail, as described above, instead of directly supporting the joined section C of the rear pillar 11 to the rear header 18 by the upper end of the second inner side reinforcement 15 extending in the vertical direction, the portion, which is further separated rearward in the vehicle from the joined section C to the rear header 18, in the rear pillar 11 is supported by the upper end of the second inner side reinforcement 15. This is effective to suppress the above-described deformation of the rear pillar 11 with the principle of leverage.

However, in order to transmit and disperse the external force, which is applied to the body side from the damper via the damper attachment section 7, as illustrated in FIG. 2, the second inner side reinforcement 15 is preferably provided to extend upward (in a vertically upper direction when possible) from the damper attachment section 7.

The position in the vehicle front-rear direction of such a second inner side reinforcement 15 possibly restricts provision of the second inner side reinforcement 15 at the position separated as much as possible to the rear in the vehicle from the joined section C with the rear header 18 in the rear pillar 11.

Thus, in this embodiment, the bulged section 33 of the wheel house outer 32 is provided with the upward extending section 36, which is closer to the rear pillar 11 than the wheel arch-shaped section 35. In this way, it is configured that the upward extending section 36 also has an effect of suppressing the vibrations of the rear pillar 11.

That is, the wheel house outer 32 is formed with the second vertical direction ridgeline section 43, which extends upward above the wheel arch-shaped section 35. In this way, it is possible to simultaneously exert an effect of transmitting and dispersing an input load from the damper to the body side and a vibration suppression effect for the rear pillar 11 without the increase in the body weight.

As an aspect of the present invention, the upward extending section 36 is provided with the plurality of the upward extending ridgeline sections 42 (the ridgeline sections), each of which extends in the vertical direction (see FIG. 1 and FIGS. 3 to 7). That is, in this example, as the upward extending ridgeline sections 42 extending in the vertical direction, the first vertical direction ridgeline section 42f, the second vertical direction ridgeline section 43, and the third vertical direction ridgeline section 44 are provided (see FIG. 1 and FIGS. 3 to 7).

In particular, the second and third vertical direction ridgeline sections 43, 44 each extends in the vertical direction at the position separated to the rear in the vehicle from the second inner side reinforcement 15. Thus, these second and third vertical direction ridgeline sections 43, 44 can simultaneously exert the displacement suppressing effect for the second inner side reinforcement 15, which is caused by the external force applied from the damper, from the cabin outer side and the deformation suppression effect for the rear pillar 11 with the rear header 18 being the point of origin.

Here, the portions of the ridgeline sections 42 that extend upward are not limited to the second vertical direction ridgeline section 43 and the third vertical direction ridgeline section 44 as described above. However, three or more of the ridgeline sections 42 may be provided.

The present invention is not limited to the configuration in the above-described embodiment, but can be implemented in various embodiments.

In this embodiment, the upward extending ridgeline section 42 includes the ridgeline portion in which the front side portion 42f, the upper side portion 42u, and the rear side portion 42r continuously extend along the outer edge of the upward extending section 36. However, the present invention is not limited thereto. The front side portion 42f, the upper side portion 42u, and the rear side portion 42r may separately be formed in a discontinued manner as long as at least a portion of the upward extending ridgeline section 42 overlaps the second inner side reinforcement 15 when seen in the vehicle side view.

In addition, the upward extending ridgeline section 42 is not limited that the portion extending in the vehicle front-rear direction overlaps so as to intersect the second inner side reinforcement 15 when seen in the vehicle side view as in this embodiment. However, it may be configured that the portion extending in the vertical direction overlaps the second inner side reinforcement 15 when seen in the vehicle side view.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

4: Rear side frame
7: Damper attachment section
11: Rear pillar (closed cross-sectional structure)
15: Second inner side reinforcement (inner-side reinforcement)
16: First door opening rear edge reinforcing member (door opening rear edge reinforcing member)
18: Rear header
24: Door opening used for seating on and leaving from rear seat
24r: Rear edge of door opening used for seating on and leaving from rear seat
30: Wheel house
31: Wheel house inner
32: Wheel house outer
33: Bulged section
35: Wheel arch-shaped section
36: Upward extending section
42: Vertical direction ridgeline section (ridgeline section)
42f, 42u: Front side portion and upper side portion of upward extending ridgeline section (ridgeline extending to door opening rear edge reinforcing member and inner-side reinforcement)
43: Second vertical direction ridgeline section (ridgeline section extending in vertical direction at position separated to rear in vehicle from inner-side reinforcement)
43, 44: Second vertical direction ridgeline section and third vertical direction ridgeline section (plurality of ridgeline sections extending in vertical direction)
C: Joined section of rear pillar to rear header

The invention claimed is:

1. A vehicle rear body structure comprising:
a wheel house that includes:
  a wheel house outer in a bulged shape that bulges toward a cabin outer side; and
  a wheel house inner located on a cabin side from the wheel house outer, wherein the wheel house inner is provided with an inner-side reinforcement that extends in a vertical direction,
in the wheel house outer, a bulged section that bulges toward the cabin outer side includes a wheel arch-shaped section that is formed in an arch shape to cover a rear wheel from above when seen in a vehicle side view, and
the wheel house outer is formed with a ridgeline section that extends upward above the wheel arch-shaped section along a bulged shape of the bulged section to the cabin outer side and at least a portion of which overlaps the inner-side reinforcement when seen in the vehicle side view.

2. The vehicle rear body structure according to claim 1, wherein
in a portion above the wheel arch-shaped section in the bulged section, an upward extending section that bulges toward the cabin outer side is provided to extend upward from the wheel arch-shaped section, and
the ridgeline section is formed along a bulged shape of the upward extending section to the cabin outer side.

3. The vehicle rear body structure according to claim 2, wherein
a damper attachment section to which an upper end portion of a suspension damper is attached for support is provided in a rear side frame provided on the cabin side and in a lower portion of the wheel house, and
the inner-side reinforcement extends upward from the damper attachment section provided in the rear side frame, and the ridgeline section of the wheel house outer extends upward across the wheel arch-shaped section from a height of the rear side frame to the upward extending section.

4. The vehicle rear body structure according to claim 2, wherein
a door opening rear edge reinforcing member is joined to the upward extending section, the door opening rear edge reinforcing member extending along a rear edge of a door opening provided in a body side portion and used for seating on and leaving from a rear seat, and
the ridgeline section extends to the door opening rear edge reinforcing member and the inner-side reinforcement, which is provided on a vehicle rear side from the door opening rear edge reinforcing member.

5. The vehicle rear body structure according to claim 3, wherein
a door opening rear edge reinforcing member is joined to the upward extending section, the door opening rear edge reinforcing member extending along a rear edge of a door opening provided in a body side portion and used for seating on and leaving from a rear seat, and
the ridgeline section extends to the door opening rear edge reinforcing member and the inner-side reinforcement, which is provided on a vehicle rear side from the door opening rear edge reinforcing member.

6. The vehicle rear body structure according to claim 2, wherein
a rear header that extends in a vehicle width direction is provided on a vehicle front side and a vehicle upper side of the inner-side reinforcement,
a closed cross-sectional structure that extends rearward from the rear header and is lowered to the rear is provided above the wheel house, and
an upper end of the inner-side reinforcement is joined to a portion, which is separated rearward from a joined section with the rear header, in the closed cross-sectional structure.

7. The vehicle rear body structure according to claim 3, wherein
a rear header that extends in a vehicle width direction is provided on a vehicle front side and a vehicle upper side of the inner-side reinforcement,
a closed cross-sectional structure that extends rearward from the rear header and is lowered to the rear is provided above the wheel house, and
an upper end of the inner-side reinforcement is joined to a portion, which is separated rearward from a joined section with the rear header, in the closed cross-sectional structure.

8. The vehicle rear body structure according to claim 4, wherein
a rear header that extends in a vehicle width direction is provided on a vehicle front side and a vehicle upper side of the inner-side reinforcement,
a closed cross-sectional structure that extends rearward from the rear header and is lowered to the rear is provided above the wheel house, and
an upper end of the inner-side reinforcement is joined to a portion, which is separated rearward from a joined section with the rear header, in the closed cross-sectional structure.

9. The vehicle rear body structure according to claim 5, wherein
a rear header that extends in a vehicle width direction is provided on a vehicle front side and a vehicle upper side of the inner-side reinforcement,
a closed cross-sectional structure that extends rearward from the rear header and is lowered to the rear is provided above the wheel house, and
an upper end of the inner-side reinforcement is joined to a portion, which is separated rearward from a joined section with the rear header, in the closed cross-sectional structure.

10. The vehicle rear body structure according to claim 2, wherein
the ridgeline section extends in the vertical direction at a position that is separated rearward in the vehicle from the inner-side reinforcement.

11. The vehicle rear body structure according to claim 3, wherein
the ridgeline section extends in the vertical direction at a position that is separated rearward in the vehicle from the inner-side reinforcement.

12. The vehicle rear body structure according to claim 4, wherein
the ridgeline section extends in the vertical direction at a position that is separated rearward in the vehicle from the inner-side reinforcement.

13. The vehicle rear body structure according to claim 5, wherein
the ridgeline section extends in the vertical direction at a position that is separated rearward in the vehicle from the inner-side reinforcement.

14. The vehicle rear body structure according to claim 6, wherein
the ridgeline section extends in the vertical direction at a position that is separated rearward in the vehicle from the inner-side reinforcement.

15. The vehicle rear body structure according to claim 7, wherein
the ridgeline section extends in the vertical direction at a position that is separated rearward in the vehicle from the inner-side reinforcement.

16. The vehicle rear body structure according to claim 8, wherein
the ridgeline section extends in the vertical direction at a position that is separated rearward in the vehicle from the inner-side reinforcement.

17. The vehicle rear body structure according to claim 9, wherein
the ridgeline section extends in the vertical direction at a position that is separated rearward in the vehicle from the inner-side reinforcement.

18. The vehicle rear body structure according to claim 4, wherein
the upward extending section is provided with a plurality of the ridgeline sections, each of which extends in the vertical direction.

19. The vehicle rear body structure according to claim 10, wherein
the upward extending section is provided with a plurality of the ridgeline sections, each of which extends in the vertical direction.

20. The vehicle rear body structure according to claim 17, wherein
the upward extending section is provided with a plurality of the ridgeline sections, each of which extends in the vertical direction.

\* \* \* \* \*